(12) United States Patent
Tsorng et al.

(10) Patent No.: US 12,555,614 B2
(45) Date of Patent: Feb. 17, 2026

(54) ROTATING DRIVE TRAY ASSEMBLY

(71) Applicant: Quanta Computer Inc., Taoyuan (TW)

(72) Inventors: Yaw-Tzorng Tsorng, Taoyuan (TW);
Tung-Hsien Wu, Taoyuan (TW);
Shin-Ming Su, Taoyuan (TW);
Hsiang-Pu Ni, Taoyuan (TW)

(73) Assignee: QUANTA COMPUTER INC.,
Taoyuan (TW)

( * ) Notice: Subject to any disclaimer, the term of this patent is extended or adjusted under 35 U.S.C. 154(b) by 166 days.

(21) Appl. No.: 18/107,190

(22) Filed: Feb. 8, 2023

(65) Prior Publication Data
US 2024/0265949 A1 Aug. 8, 2024

(51) Int. Cl.
*G11B 33/12* (2006.01)
*G11B 33/02* (2006.01)

(52) U.S. Cl.
CPC .......... *G11B 33/124* (2013.01); *G11B 33/022* (2013.01)

(58) Field of Classification Search
CPC .... G11B 33/124; G11B 33/022; G11B 33/128
See application file for complete search history.

(56) References Cited

U.S. PATENT DOCUMENTS

| | | | |
|---|---|---|---|
| 6,407,913 B1* | 6/2002 | Peachey ................. | G06F 1/187 361/679.33 |
| 10,936,527 B1* | 3/2021 | Chen ..................... | G06F 1/185 |
| 2008/0007908 A1* | 1/2008 | Chen ..................... | G06F 1/187 361/679.34 |
| 2012/0113582 A1* | 5/2012 | Hirano .................. | G06F 1/20 312/319.1 |
| 2015/0070866 A1* | 3/2015 | Li ........................ | H05K 7/1425 361/748 |
| 2019/0029145 A1* | 1/2019 | Zardkoohi ........... | G11B 33/142 |
| 2019/0252004 A1* | 8/2019 | Wang ................... | G06F 1/187 |

FOREIGN PATENT DOCUMENTS

TW M580786 U * 7/2019

* cited by examiner

*Primary Examiner* — Allen L Parker
*Assistant Examiner* — Keon Nmn Kim
(74) *Attorney, Agent, or Firm* — NIXON PEABODY LLP

(57) ABSTRACT

A drive tray assembly is disclosed for placing drives (e.g., hard disk drives) in a computer chassis in a rotated orientation and without the need for additional tools. The drive tray assembly includes an outer tray on a hinge capable of being rotated away from the computer chassis during drive changes. An inner tray, upon which a drive may be placed, is coupled to the outer tray. When the outer tray is moved to a closed position within the computer chassis, pressing on a handle can cause the inner tray to move from a disengaged position to an engaged position, thus connecting the drive to a drive backplane within the computer chassis.

18 Claims, 12 Drawing Sheets

ROTATING DRIVE TRAY ASSEMBLY

TECHNICAL FIELD

The present disclosure relates to computer chassis generally and more specifically to trays for securing drives within chassis.

BACKGROUND

Computer chassis are used in many forms and in many environments, and often include hard disk drives (HDDs) designed to be removably inserted into the chassis. In the example of a common server chassis, an HDD can be installed into a removable HDD tray, which can in turn be inserted from the front side to the rear side of the server chassis. Installation in this direction causes connectors at the end of the HDD to interact with receiving connectors on a HDD backplane located even further towards the rear of the server chassis. In such installations, the "long" dimension of the HDD tray is aligned parallel to the y-axis (e.g., front-to-back axis) of the server chassis. Thus, while such orientations can maximize the number of HDDs that could be installed through the front of the server chassis, it results in the HDD trays and the HDD backplane occupying significant amounts of y-axis space. Since server chassis must be designed to fit within a limited amount of space (e.g., within a server rack), the amount of space left for other components within the server chassis and/or behind the server chassis is limited. For example, the size of motherboard able to be used in the server chassis may be limited, and the amount of rear cable management space available is limited.

There is a need for improved chassis capable of receiving drives in improved manners. Certain aspects of the present disclosure address this need and other needs.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a drive tray assembly. The drive tray assembly includes an outer tray rotatably couplable to a chassis. The outer tray is rotatable between an open position and a closed position. The drive tray assembly further includes an inner tray for receiving a drive. The inner tray is slidably coupled to the outer tray. The inner tray is slidable between a disengaged position and an engaged position relative to the outer tray. The drive tray assembly further includes a lever rotatably coupled to the outer tray. The lever has a first arm and a second arm. The first arm is mechanically coupled to the inner tray. Movement of the lever causes the inner tray to move between the engaged position and the disengaged position. The drive tray assembly further includes a handle slidably coupled to the outer tray and mechanically coupled to the second arm of the lever. The handle is axially movable between an extended position and a retracted position relative to the outer tray. Movement of the handle between the extended position and the retracted position applies force to the second arm of the lever. The force causes the movement of the lever.

Embodiments of the present disclosure include a method. The method includes providing a computer chassis having a drive tray assembly. The drive tray assembly includes an outer tray rotatably couplable to the computer chassis. The outer tray is rotatable between an open position and a closed position. The drive tray assembly further includes an inner tray for receiving a drive. The inner tray is slidably coupled to the outer tray. The inner tray is slidable between a disengaged position and an engaged position relative to the outer tray. The drive tray assembly further includes a lever rotatably coupled to the outer tray. The lever has a first arm and a second arm. The first arm is mechanically coupled to the inner tray. Movement of the lever causes the inner tray to move between the engaged position and the disengaged position. The drive tray assembly further including a handle slidably coupled to the outer tray and mechanically coupled to the second arm of the lever. The handle is axially movable between an extended position and a retracted position relative to the outer tray. Movement of the handle between the extended position and the retracted position applies force to the second arm of the lever. The force causes movement of the lever. The method further including placing the drive in the inner tray. The method further including rotating the outer tray from the open position to the closed position. The method further including moving the handle from the extended position to the retracted position. Movement of the handle from the extended position to the retracted position causes the inner tray to move from the disengaged position to the engaged position.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
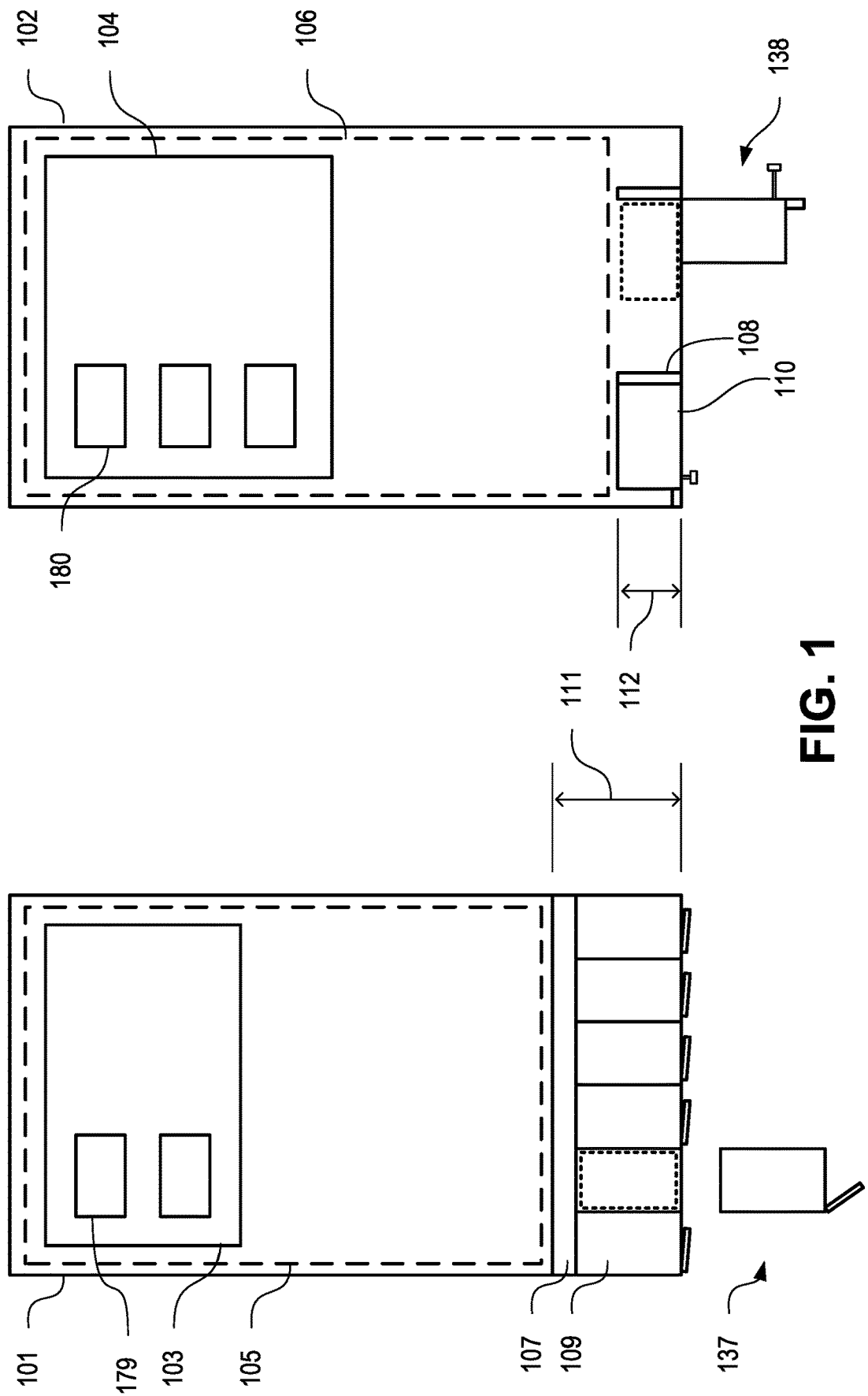
FIG. 1 is a schematic comparison top view of a standard computer chassis and a computer chassis, according to certain aspects of the present disclosure.

Certain aspects and features of the present disclosure relate to a drive tray assembly suitable for placing drives (e.g., hard disk drives) in a computer chassis in a rotated orientation and without the need for additional tools. The drive tray assembly includes an outer tray on a hinge capable of being rotated away from the computer chassis during drive changes. An inner tray, upon which a drive may be placed, is coupled to the outer tray. When the outer tray is moved to a closed position within the computer chassis, pressing on a handle can cause the inner tray to move from a disengaged position to an engaged position, thus connecting the drive to a drive backplane within the computer chassis.

Standard chassis (e.g., server chassis) into which drives (e.g., hard disk drives) are placed generally accept drives at a front end of the chassis. Making drives accessible through the front end of the chassis facilitates easy and quick drive installation and removal. Many standard chassis make use of drive trays to which a drive is attached, such as via screws. The drive tray can then be pushed into the front end of the chassis until the drive's connector couples with a corresponding connector of a drive backplane located further within the chassis. When it comes time to remove a drive, a user typically pulls on a lever of the drive tray to creating a pulling force that pulls the drive away from the drive backplane and out of the chassis. The total amount of longitudinal space (e.g., space from the front end of the chassis to the rear end of the chassis) occupied by the drives, drive trays, drive backplane, and associated hardware is often significant, such as at or around 145.85 mm. As a result, the remaining space available in the chassis is limited.

Certain aspects and features of the present disclosure include a drive tray assembly that permits drives to be placed in a rotated orientation within a chassis, while still maintaining easy access from an end of the chassis to enable quick and easy drive installation and removal. The drive tray assembly includes an outer tray rotatably coupled to the chassis (e.g., via a drive frame coupled to the chassis). The outer tray can be rotated out from the chassis towards an open position where a drive can be easily placed in or removed from the inner tray within the outer tray. The outer tray can be rotated inward (e.g., into the chassis) towards a closed position where the drive is located entirely within the chassis. Once the outer tray is in the closed position with a drive therein, pushing force applied to a handle can move the inner tray in a lateral direction (e.g., perpendicular to the sidewalls of the chassis) to force the connector of the drive into a corresponding connector of a drive backplane. Each drive tray assembly can have its own drive backplane.

Multiple outer trays, and thus multiple drives, can be accommodated by each drive tray assembly, and each chassis can accommodate multiple drive tray assemblies. Because the drives are oriented 90° rotated with respect to drives in a standard chassis, less longitudinal space within the chassis is occupied by the drives, drive trays, drive backplane(s), and associated hardware. According to certain aspects of the present disclosure, the amount of longitudinal space occupied by the drive tray assembly is at or around 84.6 mm, which is a 42% reduction from the amount of longitudinal space occupied in standard drives. This newly available space can be used for additional computing components (e.g., additional processors on a larger motherboard), for improved cooling (e.g., more room to direct airflow to needed locations and/or more room for additional cooling equipment), for improved cable management, or for other uses.

Additionally, certain aspects and features of the present disclosure include a drive tray assembly that permits drive installation and removal without the need for tools. In standard chassis, drives must generally be attached to drive trays with screws or other fasteners to avoid vertical or horizontal movement once installed. Certain aspects and features of the present disclosure include lower retention pegs on the inner tray and side retention pegs within the chassis. When a drive is set into the inner tray, its lower mounting holes can receive the lower retention pegs, both horizontally aligning the drive within the inner tray and constraining the drive from horizontal movement with respect to the inner tray. When the outer tray is moved to the closed position with a drive installed, side mounting holes of the drive can receive the side retention pegs, both vertically aligning the drive with respect to the inner tray and constraining the drive from vertical movement with respect to the inner tray. The side retention pegs can be positioned on a slider that is constrained from vertical movement with respect to the inner tray, thus permitting the slider and side retention pegs to follow the movement of the inner tray between the disengaged position and the engaged position. Because of the use of side retention pegs, the drive tray assembly can permit the use of drives of different heights. For example, a 15 mm high drive may occupy nearly all of the vertical space available in the inner tray, and vertical movement (e.g., vertical vibrations) may be naturally constrained by adjacent structures, however when a 7 mm high drive is used, the side retention pegs ensure that the drive's connector is vertically aligned with respect to the corresponding connector of the drive backplane, as well as constrain the drive from undesired vertical movement.

Certain aspects and features of the present disclosure provide for a drive tray assembly that permits easy and quick access to install and/or remove drives (e.g., hard disk drives) without the need for tools.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic comparison top view of a standard computer chassis 101 and a computer chassis 102 according to certain aspects of the present disclosure. For illustrative purposes, various structures and computer components, including wiring, are not shown.

The standard computer chassis 101 includes a series of drives 109 installed (e.g., with screws) within removable drive trays 137. For illustrative purposes, the second drive tray 137 from the left is shown in a removed state. The drives 109, when installed in the standard computer chassis 101, are longitudinally aligned (e.g., the long axis of the drive being aligned) with the longitudinal axis of the standard computer chassis 101 (e.g., the y-axis of the standard computer chassis 101, or bottom-to-top axis as seen in FIG. 1). Each drive 109 is coupled to a common drive backplane 107. The drives 109 and drive backplane 107 occupy a certain amount of longitudinal space, referred to as the drive space 111. The remainder of the standard computer chassis 101 not occupied by the drive space 111 is referred to as the non-drive space 105. The non-drive space 105 can include various components and structures, including a motherboard 103 containing a limited number of processors 179 (e.g., two processors 179, as seen in FIG. 1).

A computer chassis 102 according to certain aspects of the present disclosure is depicted in comparison with the standard computer chassis 101. The computer chassis 102 includes multiple drives 110 installed (e.g., without the use of tools) in drive tray assemblies 138 that are rotatably attached to the computer chassis 102. For illustrative purposes, the drive tray assembly 138 on the right is shown in an open configuration. When the drives 110 are fully installed (e.g., the drives 110 are installed in their respective drive tray assemblies 138, each of which is rotated to its closed configurations and actuated to communicatively couple their respective drive 110 to the corresponding drive backplane 108), they are longitudinally aligned perpendicular to the longitudinal axis of the computer chassis 102. More specifically, the drives 110 can be longitudinally aligned along an axis that is perpendicular to the sidewalls of the computer chassis 102. The drives 110 and drive backplanes 108 occupy a certain amount of longitudinal space, referred to as the drive space 112. The remainder of the computer chassis 102 not occupied by the drive space 112 is referred to as the non-drive space 106. The non-drive space 106 can include various components and structures, including a motherboard 104 containing a number of processors 180 (e.g., three processors 180, as seen in FIG. 1).

As seen in the comparison of the standard computer chassis 101 with standard drives 109 and the computer chassis 102 according to certain aspects of the present disclosure, the computer chassis 102 has greater non-drive space 106 than the standard computer chassis's 101 non-drive space 105. This greater non-drive space 106 can be utilized in various fashions to improve the computing ability, cooling ability, weight, storage ability, cost, organization, or other aspects of the computing system associated with the computer chassis 102. For example, as depicted in FIG. 1, a larger motherboard 104 (e.g., larger than the motherboard 103) is able to be used in the computer chassis 102, which can permit the use of a greater number of processors 180 than available for the motherboard 103. This greater number of processors 180 can be leveraged to improve the computing ability and/or efficiency of the computing system associated with computer chassis 102 over that of the computing system associated with the standard computing chassis 101.

Computer chassis 102 can include any number of drives 110, depending on the height and width of the computer chassis 102. In some cases, the computer chassis 102 has a width suitable for receiving two drive tray assemblies 138, with the total number of drives 110 defined by the height of computer chassis 102 (e.g., a computer chassis 102 of a first height that is two drives high, permitting four total drives 110, whereas a computer chassis 102 of a second height that is three drives high would permit six total drives 110). Any suitable number of drives 110 and/or drive tray assemblies 138 may be used.

Figure 2:
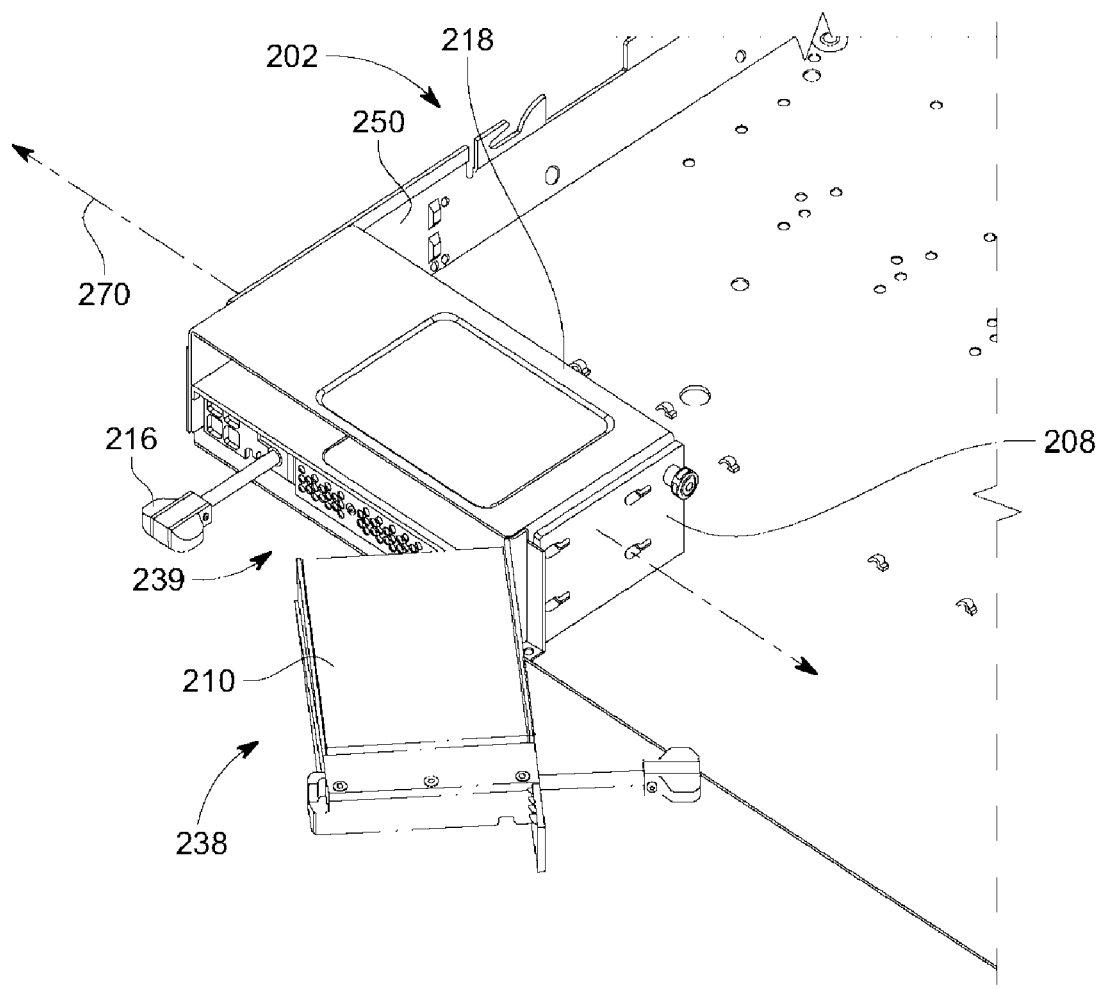
FIG. 2 is an isometric view of a computer chassis with a rotating drive tray assembly, according to certain aspects of the present disclosure.

FIG. 2 is an isometric view of a computer chassis 202 with a rotating drive tray assembly 238, according to certain aspects of the present disclosure. Various components of the computer chassis 202, such as the top cover, are not depicted for illustrative purposes. The computer chassis 202 can be any suitable computer chassis, such as computer chassis 102 of FIG. 1. Drive tray assembly 238 can be any suitable drive tray assembly, such as drive tray assembly 128 of FIG. 1. The computer chassis 202 can have a longitudinal direction (e.g., from bottom left to top right of FIG. 2) and a lateral direction (e.g., from bottom right to top left of FIG. 2). The longitudinal direction can be parallel to the sidewalls 250 of the computer chassis 202. The drive tray assembly 238 can allow a drive 210 to be installed in the computer chassis 202 in a rotated (e.g., lateral) orientation.

The drive tray assembly 238 is shown in an open configuration, while the drive tray assembly 239 is shown in a closed configuration. Each drive tray assembly 238, 239 contains a drive 210, which can be removed when the drive tray assembly 238 is in the open configuration by lifting the drive 210 out of the drive tray assembly 238. The drive 210 can be a hard disk drive, a solid state drive, or any suitable type of drive. In some cases, the drive 210 is a storage device for long-term memory.

Each drive tray assembly 238, 239 includes a handle 216. The handle 216 can be used to facilitate moving the drive tray assembly 238 between an open configuration and a closed configuration, although that need not always be the case. The handle 216 can lock in an extended position and/or a retracted position. Rotation of the handle 216 can disengage the lock, allowing the handle 216 to move between the extended position and the retracted position. The handle 216 can be biased to a neutral position (e.g., neutral rotational position) in which the handle 216 can lock in the extended position and/or retracted position. In an extended position, the handle 216 maintains an inner tray, and thus the drive 210, in a disengaged position. However, when the handle 216 is in the retracted position, the handle maintains the inner tray, and thus drive 210, in an engaged position, as described in further detail herein.

The drive tray assembly 238 is rotatably coupled to the computer chassis 202. In some cases, the drive tray assembly 238 is rotatably coupled to the computer chassis 202 via a drive frame 218. The drive tray assembly 238 can be coupled to the drive frame 218 by a hinge located adjacent an end (e.g., the front end) of the computer chassis 202, such that the drive tray assembly 238 can be rotated fully or almost fully out from the computer chassis 202, such that the drive 210 can be lifted out of the drive tray assembly 238 without interference from the computer chassis 202. The drive frame 218 can support one or more drive tray assemblies 238, 239, as well as one or more drive backplanes 208. A drive backplane 208 provides a connector to which the drive 210 can be coupled for communicative and electrical coupling with the computing system within the computer chassis 202. The drive backplane 208 can be mechanically coupled to the drive frame 218, such as by a fastener (e.g., a screw or thumbscrew).

Each drive 210 includes a connector for communicatively and electrically coupling the drive 210 to the computer system within the computer chassis 202. More specifically, the drive 210 can include a connector at its end (e.g., the end facing the bottom-right corner of the figure when the drive tray assembly 238, 239 is in the closed configuration). When the drive tray assembly 238, 239 is in the closed configuration and the handle 216 is actuated (e.g., moved between an extended position and a retracted position), the drive 210 is moved along axis 270 (e.g., perpendicular to sidewalls 250). When the handle 216 is moved from an extended position to a retracted position, drive 210 is moved towards the drive backplane 208, thus causing the connector of the drive 210 to engage with and couple with the corresponding connector on the drive backplane 208.

Figure 3:
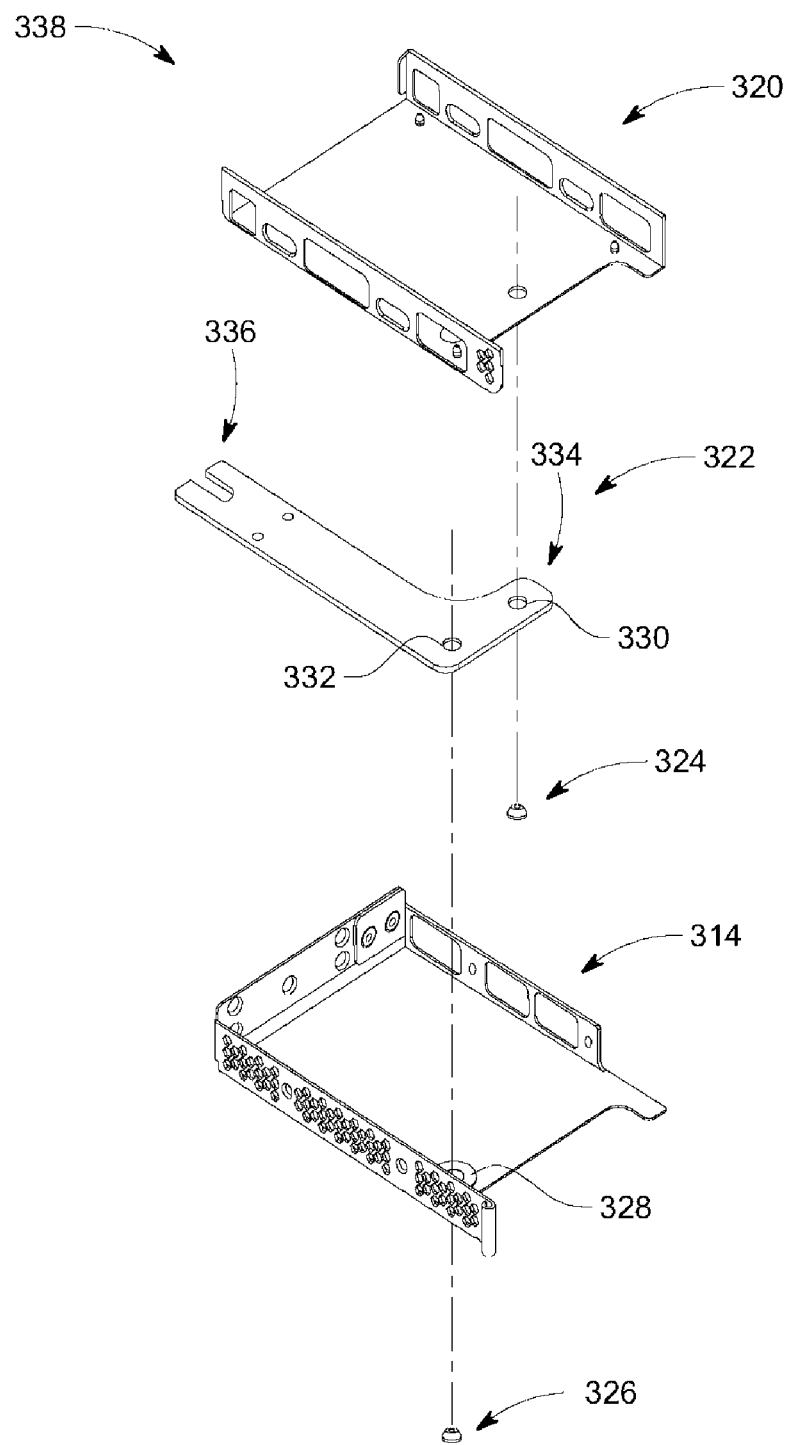
FIG. 3 is an isometric exploded view of portions of a drive tray assembly, according to certain aspects of the present disclosure.

FIG. 3 is an isometric exploded view of portions of a drive tray assembly 338, according to certain aspects of the present disclosure. The portions of the drive tray assembly 338 can be from any suitable drive tray assembly, such as from drive tray assembly 128 of FIG. 1.

The drive tray assembly 338 can include an inner tray 320 that fits within an outer tray 314. The inner tray 320 can be slidably coupled to the outer tray 314 to constrain the inner tray 320 against vertical movement (e.g., up towards the top of the figure and down towards the bottom of the figure as seen in FIG. 3) and against movement other than along a sliding axis (e.g., axis 270 of FIG. 2).

A lever 322 can be coupled to the outer tray 314 and inner tray 320 to effectuate movement of the inner tray 320 with respect to the outer tray 314 along the sliding axis. The lever 322 can include a pivot point coupled to the outer tray 314 at an aperture 328, such as by a rivet 326. The lever 322 can include a first arm 334 and a second arm 336, such that rotation of the second arm 336 about pivot point 332 causes the first arm 334 to rotate about the pivot point 332. The first arm 334 can be coupled to the inner tray 320 at aperture 330, such as by rivet 324. In some cases, instead of rivets and apertures, other techniques can be used to rotatably couple the lever 322 to the inner tray 320 and/or outer tray 314, such as via other fasteners or via pegs of one element fitting into holes of another element. The second arm 336 of the lever 322 can include a feature for engaging the handle (e.g., handle 216 of FIG. 2), such as a cutout or other opening, although other techniques can be used.

Figure 4:
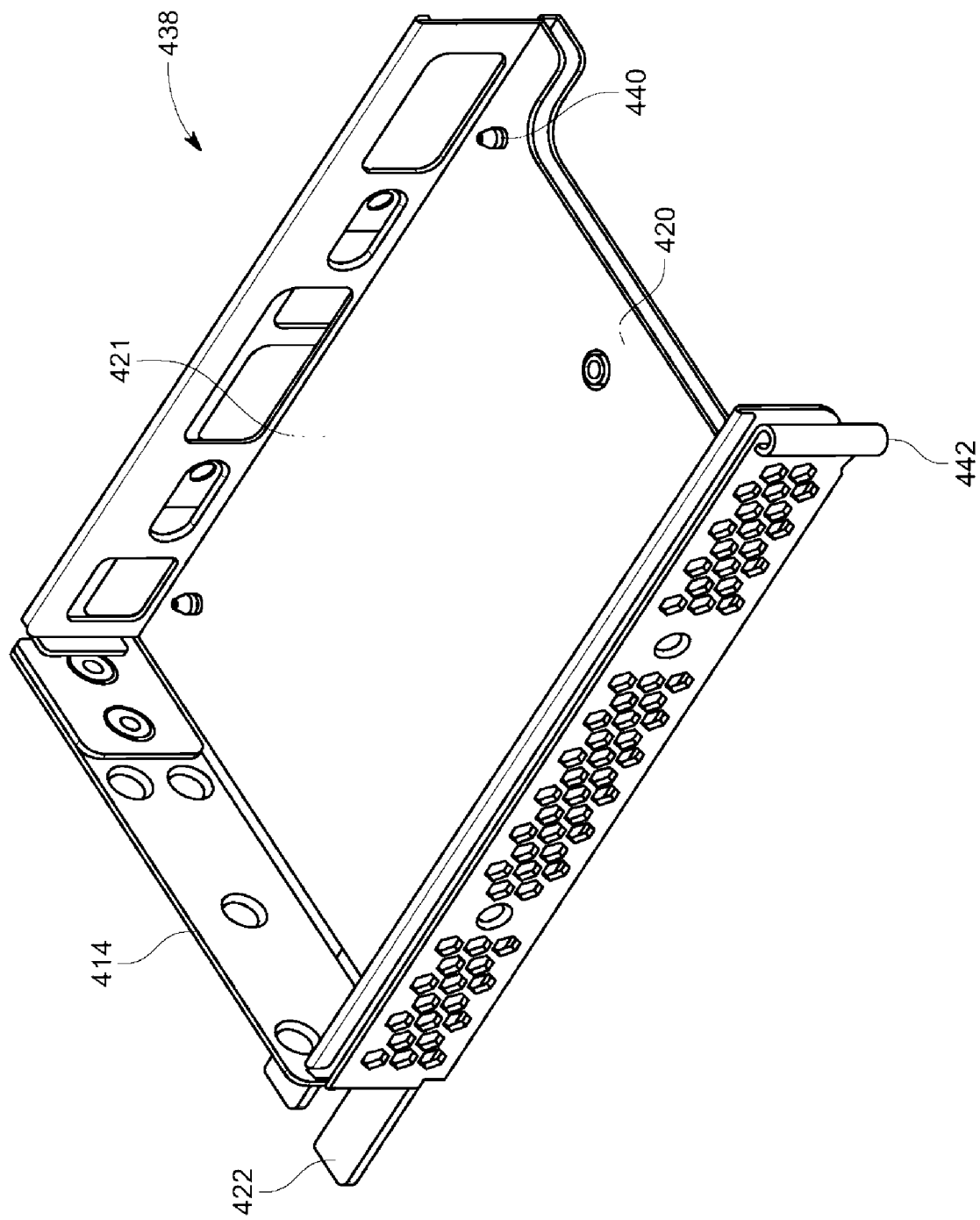
FIG. 4 is an isometric view of portions of a drive tray assembly, according to certain aspects of the present disclosure.

FIG. 4 is an isometric view of portions of a drive tray assembly 438, according to certain aspects of the present disclosure. The portions of the drive tray assembly 438 can be from any suitable drive tray assembly, such as from drive tray assembly 128 of FIG. 1. In some cases, the portions of the drive tray assembly 438 depicted in FIG. 4 are the portions of the drive tray assembly 338 of FIG. 3 after assembly.

The inner tray 420 is depicted situated within the outer tray 414. A portion (e.g., the second end) of the lever 422 is visible. The outer tray 414 can include a hinge 442. The hinge 442 can accept a rivet or other rod or rod-like fastener, allowing the outer tray 414 to rotate about the rivet or other rod or rod-like fastener. The hinge 442 can be shaped as a curled portion of the wall of the outer tray 414, although that need not always be the case.

The inner tray 420 can include a set of lower retention pegs 440 positioned at an upper surface 421 of the inner tray 420. The lower retention pegs 440 can be formed from the material of the inner tray 420 (e.g., steel or other suitable material) or can be separately formed and coupled to the inner tray 420. The lower retention pegs 440 are positioned on the upper surface 421 in a pattern that corresponds with lower mounting holes of standard drives (e.g., the mounting holes commonly used to receive screws when mounting the drive to other drive trays). The lower retention pegs 440 can be tapered to center within respective lower mounting holes and align a drive placed in the inner tray 420 to a known location with respect to the inner tray 420. The lower retention pegs 440 can constrain a drive from horizontal movement with respect to inner tray 420.

Figure 5:
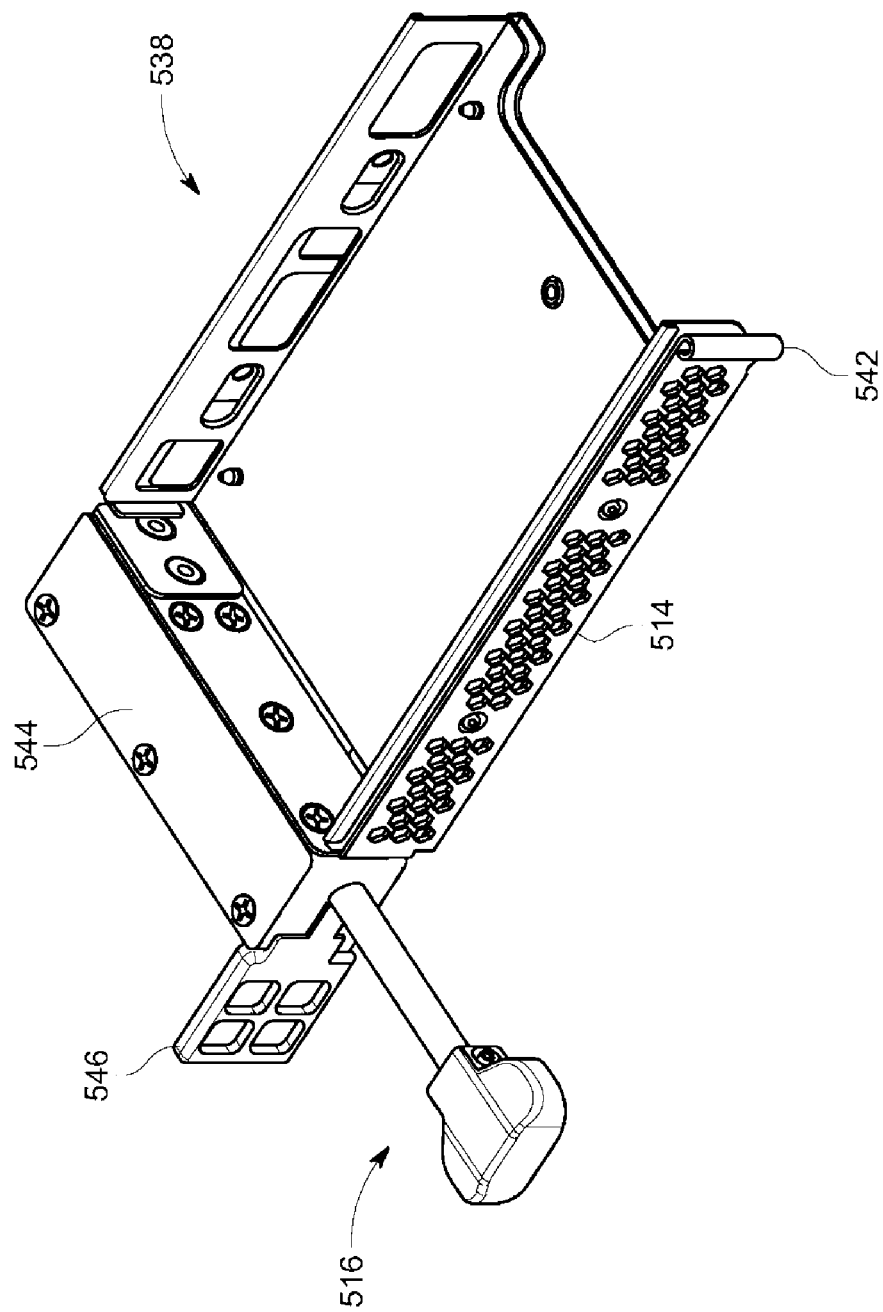
FIG. 5 is an isometric view of a drive tray assembly, according to certain aspects of the present disclosure.

FIG. 5 is an isometric view of a drive tray assembly 538, according to certain aspects of the present disclosure. The drive tray assembly 538 can be any suitable drive tray assembly, such as from drive tray assembly 128 of FIG. 1. In some cases, the drive tray assembly 538 can be the portions of the drive tray assembly 438 of FIG. 4 after attachment of a guide channel 544, a handle 516, and an offset cover 546.

The handle 516, which interacts with the lever (e.g., lever 422 of FIG. 4), fits within a guide channel 544, which is coupled to the outer tray 514. Within the guide channel 544, the handle 516 can move axially, in and out of the guide channel 544, as well as rotate within the guide channel 544.

The offset cover 546 can be positioned adjacent to and coupled to the outer tray 514 to occupy space, when the drive tray assembly 538 is in a closed configuration, that would be required for clearance when the drive tray assembly 538 is rotated towards an open configuration. As depicted in FIG. 5, the offset cover 546 can be coupled to the outer tray 514 at a corner of the drive tray assembly 538 that is connected to the hinge 542 by an edge of the drive tray assembly 538. The width of the offset cover 546 can be sized to permit a corner of the drive tray assembly 538 that is opposite the hinge 542 to rotate about the hinge 542. Put another way, the offset cover 546 can be sized such that the distance between the hinge 542 and the far end of the offset cover 546 is at or greater than the distance between the hinge 542 and the opposite corner of the drive tray assembly 538.

Figure 6:
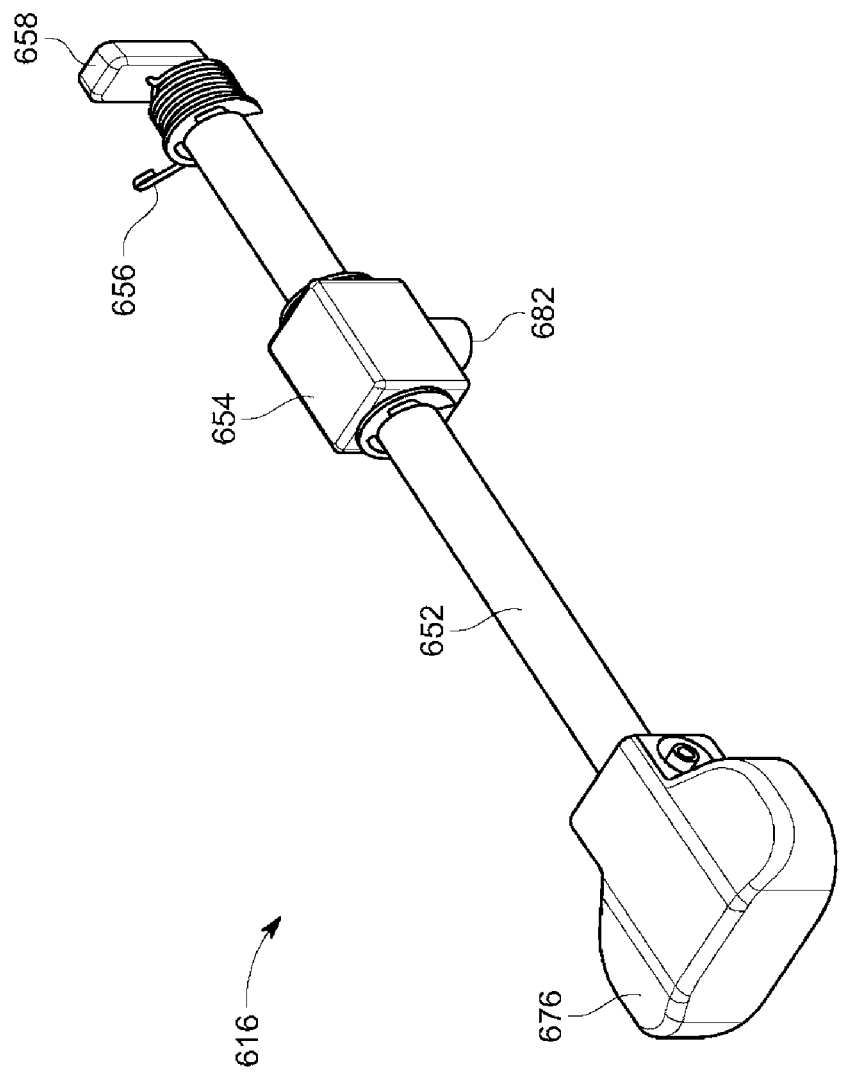
FIG. 6 is an isometric view of a handle of a drive tray assembly, according to certain aspects of the present disclosure.

FIG. 6 is an isometric view of a handle 616 of a drive tray assembly, according to certain aspects of the present disclosure. The handle 616 can be any suitable handle, such as handle 516 of drive tray assembly 538 of FIG. 5. While handles can take other suitable shapes and configurations, the handle 616 includes a rod 652 with a grip 676 at a first end and a key 658 at an opposite end. The key 658 can be coupled to the rod 652 or formed of the same material as the rod 652 (e.g., unibody). The key 658 can be an offset portion that extends away from the surface of the rod 652.

A biasing device 656 (e.g., a spring) can be coupled to the rod 652 to bias the rod 652 to a neutral rotational position (e.g., a position with the key 658 pointing up). In some cases, the biasing device 656 is a spring having a first end passing through a hole in the key 658 and a second end that extends away from the rod 652 to engage a wall of the guide frame (e.g., guide channel 544 of FIG. 5). In some cases, the biasing device 656 can be axially constrained on the rod 652 by a retaining ring that fits within a slot of the rod 652.

In some cases, the handle 616 can include a connector 654. The connector 654 can be axially constrained with respect to the rod 652, such as by retaining rings that fit within slots of the rod 652, while being rotationally free with respect to the rod 652 (e.g., the rod 652 can rotate within the connector 654). The connector 654 can include a boss 682 designed to fit within a corresponding slot of a lever (e.g., lever 422 of FIG. 4) to facilitate movement of the lever when the handle 616 is slid axially. In some cases, the connector 654 can connect to the layer by other means. The connector 654 can include sidewalls sized to engage walls of a guide frame (e.g., guide channel 544 of FIG. 5) such that the connector 654 is constrained from rotation while within the guide frame, even as the rod 652 rotates within the guide frame. Thus, the boss 682 can remain engaged with the lever.

In some cases, the grip 676 can be rotationally attached to the rod 652 to rotate in a direction perpendicular to the axis of the rod 652, such as to fold up or down when a smaller overall length of the handle 616 is desired.

Figure 7:
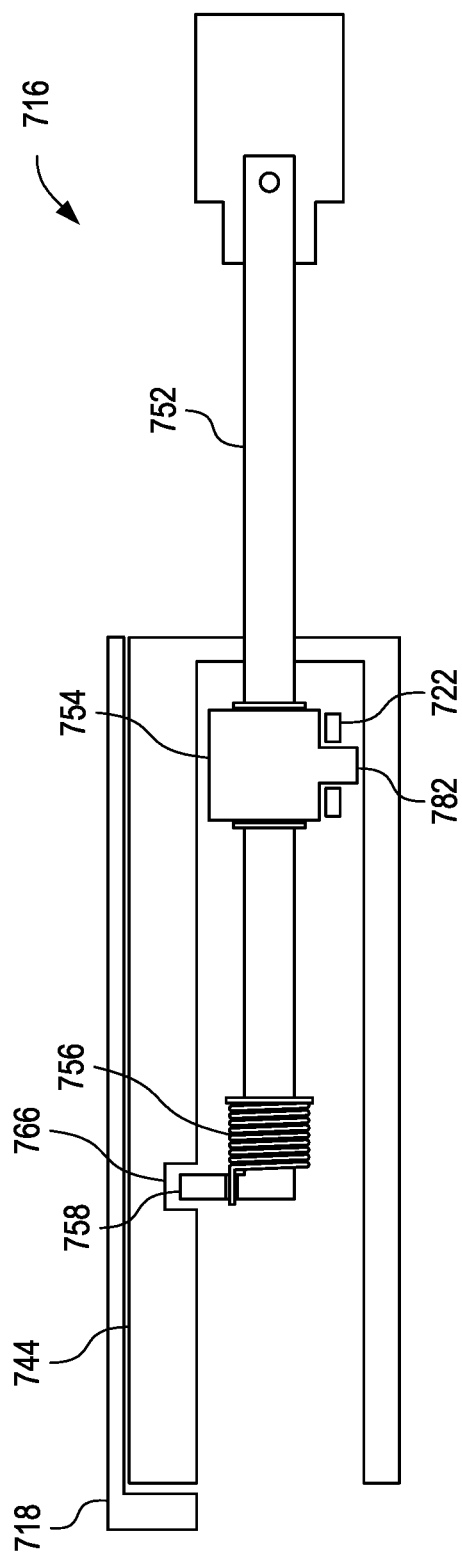
FIG. 7 is a side cutaway view of a handle in an extended position in a drive tray assembly, according to certain aspects of the present disclosure.

FIG. 7 is a side cutaway view of a handle 716 in an extended position in a drive tray assembly, according to certain aspects of the present disclosure. The handle 716 can be the handle 616 of FIG. 6 after being placed within a guide frame 744 (e.g., guide channel 544 of FIG. 5). A portion of the drive frame 718 adjacent the guide frame 744 when the outer tray is in a closed position is depicted for illustrative purposes. The portion of the drive frame 718 depicted can be a top surface of the drive frame or a partition of the drive frame, depending on whether the guide frame 744 is inserted into a topmost receiving space or other receiving space, respectively, in a drive frame 718. The rod 752 of the handle 716 passes into the guide frame 744 and is held in alignment within the guide frame 755 at least in part by connector 754, which includes sidewalls that engage walls of the guide frame 744. The boss 782 of the connector 754 can fit within a slot of lever 722, such that axial movement of the handle 716 (e.g., right to left as seen in FIG. 7) results in translation of the second end of the lever 722, thus causing the inner tray of the drive tray assembly to move to an engaged position.

The key 758 of the handle 716 can engage a locking feature 766 of the guide frame 744. When the key 758 is engaged with the locking feature 766 (e.g., a slot, a cutaway, an endstop, or other similar structure), the handle 716 is constrained from axial movement within the guide frame 744. In this position, applying a pulling force on the handle 716 (e.g., pulling towards the right of the figure) can facilitate pulling the drive tray assembly to an open configuration, while applying a pushing force in the opposite direction can facilitate pushing the drive tray assembly towards the closed configuration.

Biasing device 756 (e.g., a spring) can bias the handle 716 to a neutral rotational position, with the key 758 pointing in a direction (e.g., upwards) to engage the locking feature 766. Rotation of the handle 716 can move the key 758 away from the locking feature 766, thus permitting the handle 716 to move axially. In some cases, the inner wall(s) of the guide frame 744 can be shaped to keep the handle 716 in a rotated position while the handle 716 is not in the extended or retracted positions. In such cases, when the handle 716 moves into the extended or retracted positions, the handle 716 can be biased to rotate back to the neutral rotational position, and thus the key 758 can engage the locking feature 766.

Figure 8:
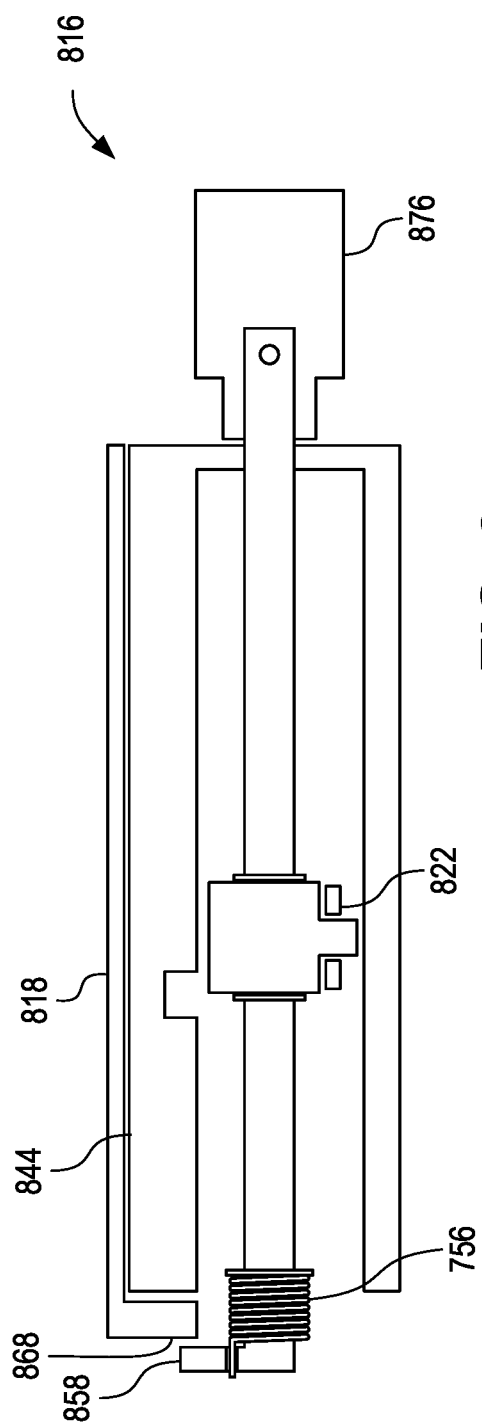
FIG. 8 is a side cutaway view of a handle in a retracted position in a drive tray assembly, according to certain aspects of the present disclosure.

FIG. 8 is a side cutaway view of a handle 816 in a retracted position in a drive tray assembly, according to certain aspects of the present disclosure. The handle 816 can be handle 716 of FIG. 7 after movement of the handle 716 to the retracted position. A portion of the drive frame 818 adjacent the guide frame 844 when the outer tray is in a closed position is depicted. The portion of the drive frame 818 depicted can be a top surface of the drive frame or a partition of the drive frame, depending on whether the guide frame 844 is inserted into a topmost receiving space or other receiving space, respectively, in a drive frame 818.

The key 858 of the handle 816 can engage a second locking feature 868 (e.g., a slot, a cutaway, an endstop, or other similar structure). The second locking feature 868 can be a portion of the drive frame 818 (e.g., an endstop formed of the top surface or a partition of the drive frame 818). When the key 858 is engaged with the second locking feature 868, the handle 816 is constrained from axial movement with respect to the drive frame 818. In some cases, a feature of the handle 816, such as a surface of the grip 876, can interact with the guide frame 844 to further constrain axial movement of the handle 816 with respect to the drive frame 818. In the retracted position, the handle 816 has moved to a position such that the lever 822 is rotated sufficiently to move the inner tray to an engaged position.

Additionally, since the guide frame 844 is coupled to the chassis, engagement of the key 858 with the second locking feature 868 constrains the outer tray from rotation with respect to the chassis, thus locking the outer tray in place while the drive within is connected to the drive backplane. As described in further detail herein, a tab of the inner tray can further constrain the outer tray from rotation while the handle 816 is being moved from the retracted position towards an extended position, during which time the handle 816 is no longer engaged with the second locking feature 868. Thus, the tab further ensures the outer tray will not rotate out before the drive within is disconnected from the drive backplane.

When the inner tray is in an engaged position, the drive tray assembly can be locked from moving out of the closed configuration, as disclosed in further detail herein. Thus, applying a pulling force on the handle 816 (e.g., pulling towards the right of the figure) may not cause the drive tray assembly to move from the closed configuration. Additionally, in some cases, the inner tray can be shaped such that the handle 816 cannot move into and/or lock into the retracted position until the drive tray assembly is in the closed configuration.

When in the retracted position, rotation of the handle 816 away from a neutral position (e.g., against biasing device 856) can move the key 858 away from the locking structure 866, thus permitting the handle 816 to move axially (e.g., away from the retracted position).

Figure 9:
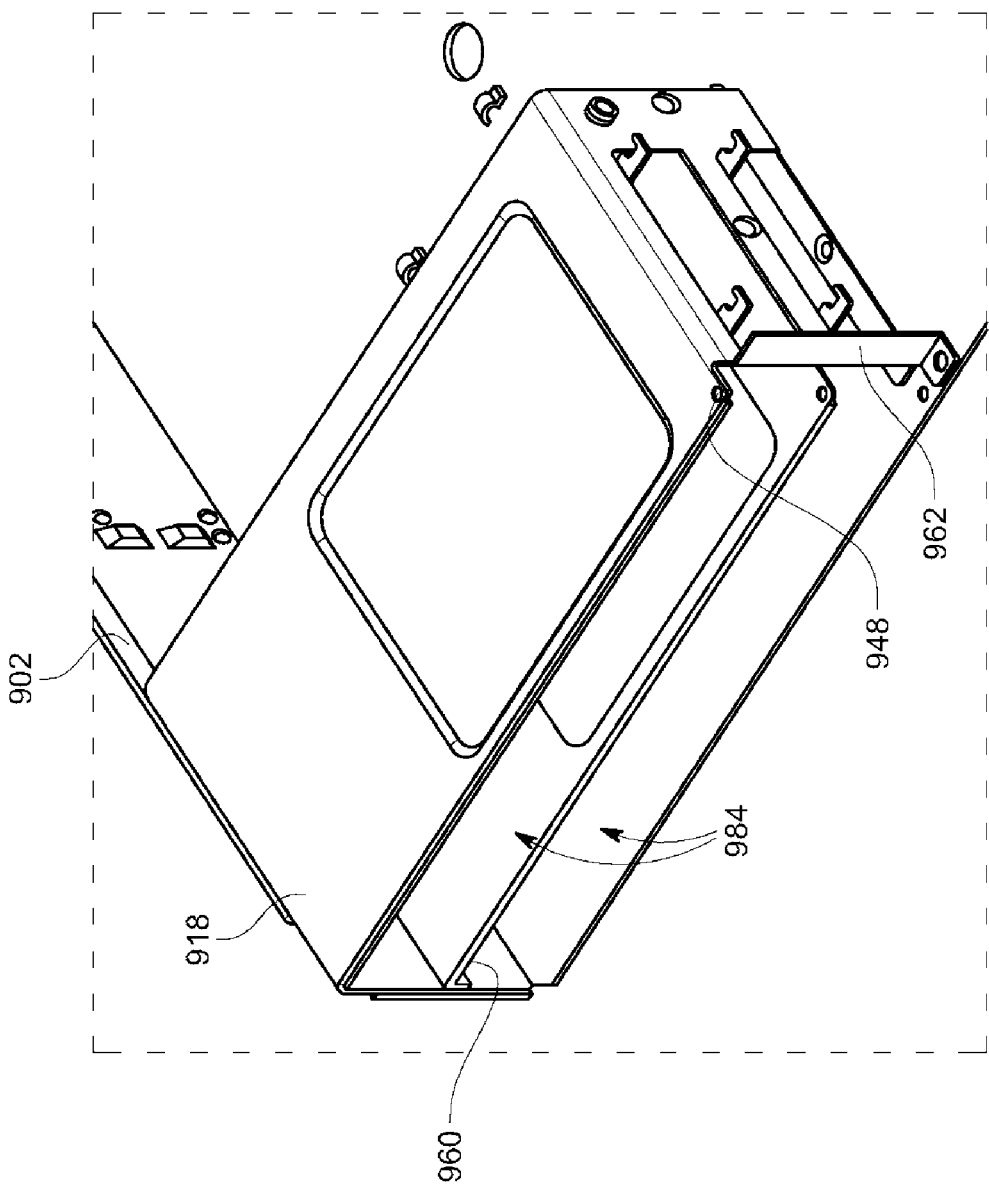
FIG. 9 is an isometric view of a front of a drive frame, according to certain aspects of the present disclosure.

FIG. 9 is an isometric view of a front of a drive frame 918, according to certain aspects of the present disclosure. The drive frame 918 can be any suitable drive frame, such as drive frame 118 of FIG. 1. The drive frame 918 can include two receiving spaces 984, each capable of receiving a drive tray assembly (e.g., drive tray assembly 538 of FIG. 5). In some cases, the drive frame 918 can be sized to have one receiving space 984 or more than two receiving spaces 984. Each receiving space can be separated by a partition 960. The partition 960 can be made of a conductive metal. The partition 960 can facilitate electromagnetically isolating a drive above the partition 960 from a drive below the partition 960. The drive frame 918 can be coupled to the chassis 902.

A pivot point 948 on the drive frame 918 can accept a rivet, bar, or other structure about which the drive tray assembly can rotate. The pivot point 948 can be a hole, although that need not always be the case. In some cases, each drive tray assembly in a drive frame 918 can rotate about the same pivot point 948, although that need not always be the case. In some cases, a hole or other features corresponding to the pivot point 948 can be included in the chassis 902, such as to facilitate rotatably attaching the drive tray assembly to the chassis 902 via the drive frame 918.

The drive frame 918 can include a locking structure 962. The locking structure 962 can be a metal wall adjacent the pivot point 948. When a drive tray assembly is installed in the drive frame 918 and positioned in a closed configuration, a tab of the inner tray engages the locking structure 962 when the inner tray is in an engaged position, thus locking the drive tray assembly in the closed configuration.

Figure 10:
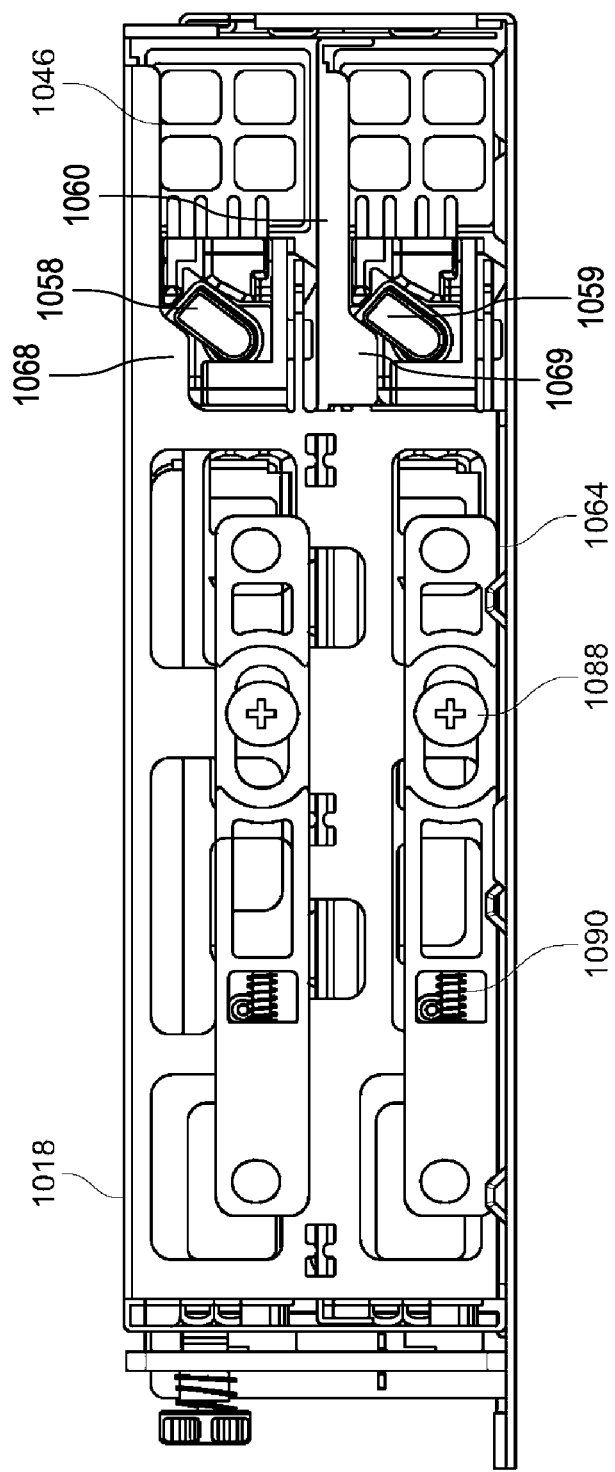
FIG. 10 is a rear view of a drive frame, according to certain aspects of the present disclosure.

FIG. 10 is a rear view of a drive frame 1018, according to certain aspects of the present disclosure. The drive frame 1018 can be a rear view of the drive frame 918 of FIG. 9. A slider 1064 can be coupled to a rear side of the drive frame 1018 at each drive tray assembly. The slider 1064 can be coupled to the drive frame 1018 to slidably move in the same direction as the inner tray when the drive tray assembly is in the closed configuration (e.g., along a left-to-right axis as seen in FIG. 10). The slider 1064 can be coupled to the drive frame 1018 by a screw 1088 or other fastener, or otherwise. One or more mechanical features (e.g., metal shelfs, ledges, etc.) of the drive frame 1018 and/or the slider 1064 can facilitate constraining the slider 1064 to sliding movement. In some cases, the slider 1064 includes a biasing device 1090 (e.g., spring) between the slider 1064 and the drive frame 1018, biasing the slider 1064 to its position corresponding with the inner tray in the disengaged position (e.g., towards the right as seen in FIG. 10).

The slider 1064 can include side retention pegs designed to engage corresponding mounting holes of the drive when the drive tray assembly is moved into the closed configuration.

Also depicted in FIG. 10 is a rear side of the offset cover 1046. In some cases, the offset cover 1046 can include windows, such as four windows as depicted in FIG. 10. In some cases, the offset cover 1046 can be solid, can be perforated, or can be otherwise configured. In some cases, windows or other openings in the offset cover 1046 can facilitate improved airflow through the chassis. Such windows or other openings should be sufficiently small to discourage tools or pieces from accidentally falling into the chassis from the front of the chassis.

Also seen in FIG. 10 is the key 1058 of the handle turned to an unlocking position. When the handle is fully inserted and allowed to turn to a locking position, the key 1058 will engage with the second locking feature 1068 of the top surface of the drive frame 1018. Likewise, key 1059 can engage the second locking feature 1069 of the partition 1060 of the drive frame 1018.

Figure 11:
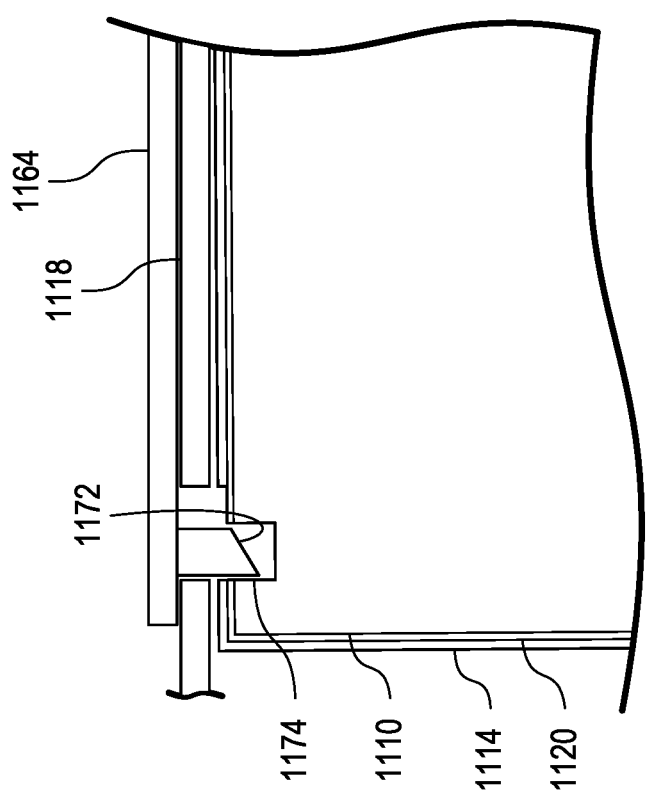
FIG. 11 is a partial schematic top view of side retention pegs engaging a drive, according to certain aspects of the present disclosure.

FIG. 11 is a partial schematic top view of side retention pegs 1172 engaging a drive 1110, according to certain aspects of the present disclosure. The drive 1110 can be any suitable drive, such as drive 110 of FIG. 1. The drive 1110 can be positioned within an inner tray 1120, which is in a disengaged position within an outer tray 1114. The outer tray 1114 is almost in its closed position.

The side retention pegs 1172 can be positioned on slider 1164 and can pass through openings in the wall of the drive frame 1118, the wall of the outer tray 1114, and the wall of the inner tray 1120 until reaching the side mounting holes 1174 of the drive 1110. The side retention pegs 1172 can be shaped to facilitate movement of the outer tray 1114 between a closed position and an open position, such as via an inclined point. Generally, each slider 1164 can include two side retention pegs 1172, although that need not always be the case. Holes in the walls of the drive frame 1118 and outer tray 1114 can be sufficiently sized to permit the slider 1164 and its side mounting pegs 1172 to slide a distance that the inner tray 1120 moves when moving between its disengaged and engaged positions.

Figure 12:
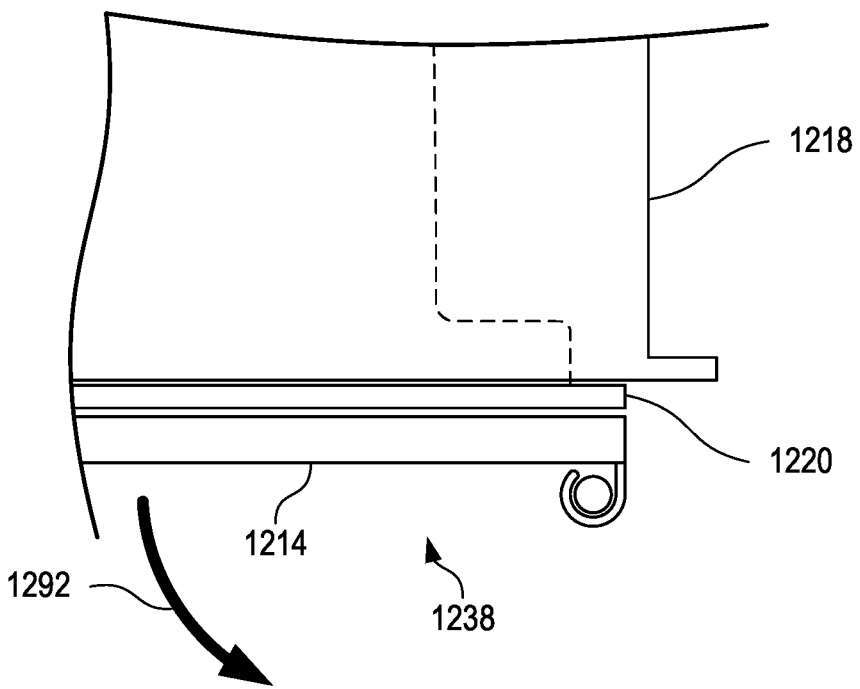
FIG. 12 is a partial schematic top view of a drive tray assembly in an unlocked configuration, according to certain aspects of the present disclosure.

FIG. 12 is a partial schematic top view of a drive tray assembly 1238 in an unlocked configuration, according to certain aspects of the present disclosure. Drive tray assembly 1238 can be any suitable drive tray assembly, such as drive tray assembly 138 of FIG. 1. The drive tray assembly 1238 can be rotationally coupled to a drive frame 1218. The drive frame 1218 can be any suitable drive frame, such as drive frame 918 of FIG. 9. Certain components (e.g., drive backplane) are not depicted for illustrative purposes.

When in the unlocked configuration, the inner tray 1220 of the drive tray assembly 1238 is positioned in its disengaged position. In this unlocked configuration, the outer tray 1214 is able to be rotated away from the closed position, such as in direction 1292.

Figure 13:
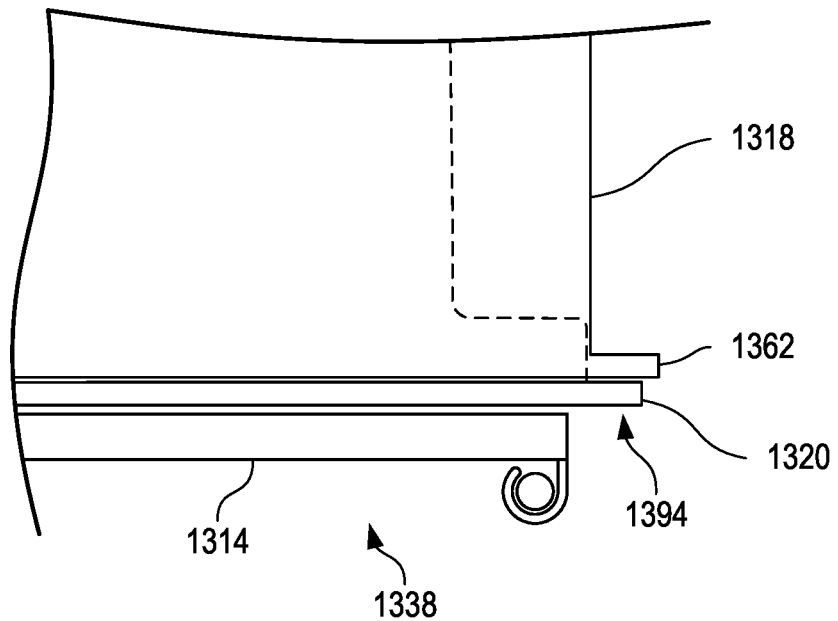
FIG. 13 is a partial schematic top view of a drive tray assembly in a locked configuration, according to certain aspects of the present disclosure.

FIG. 13 is a partial schematic top view of a drive tray assembly 1338 in a locked configuration, according to certain aspects of the present disclosure. The drive tray assembly 1338 can be drive tray assembly 1228 of FIG. 12 after movement of the inner tray 1220 into its engaged position.

When the inner tray 1320 is in the engaged position, a tab 1394 of the inner tray 1320 moves adjacent to the locking structure 1362 of the drive frame 1318. In this position, any attempt to move the outer tray 1314 away from the closed position would cause the tab 1394 to engage the locking structure 1362, thus preventing movement of the outer tray 1314 away from the closed position. Thus, the drive tray assembly 1238 is in the locked configuration. In some cases, the locking feature of the tab 1394 engaging the locking structure 1362 is used in addition to the locking abilities of the handle engaging the drive frame, as described herein in further detail. In such cases, the locking feature of the tab 1394 engaging the locking structure 1362 can be especially useful for keeping the outer tray from rotating until after the drive within has disconnected from the drive backplane, thus avoiding damage to the delicate connectors of the drive and/or drive backplane.

Figure 14:
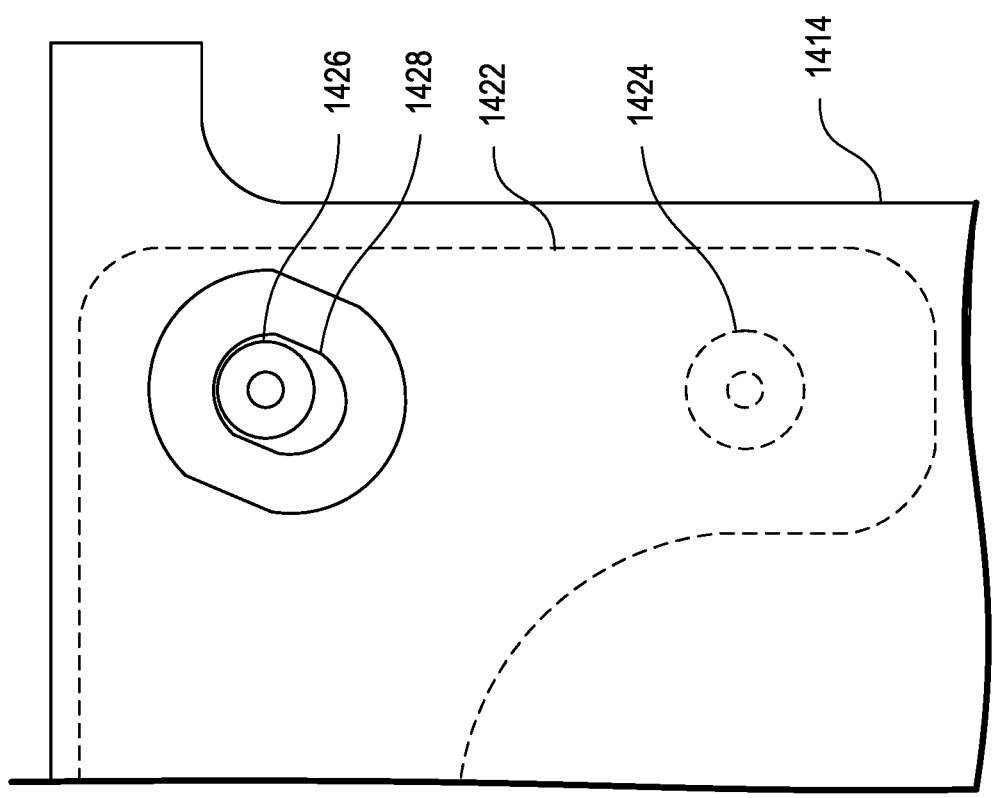
FIG. 14 is a partial schematic bottom view of an outer tray, according to certain aspects of the present disclosure.

FIG. 14 is a partial schematic bottom view of an outer tray 1414, according to certain aspects of the present disclosure. Lever 1422, which is located on the opposite side of the outer tray 1414 as seen from the bottom of the outer tray 1414, is depicted in dashed line for illustrative purposes.

The outer tray 1414 can include an aperture 1428 through which a rivet 1426 or other fastener can pass to secure the lever 1422 to the outer tray 1414. The aperture 1428 of the outer tray 1414 can be in the form of an elongated hole, permitting the rivet 1426 to slide within the elongated hole of aperture 1428. Translation of the rivet 1426 thus causes translation of the point of rotation about which lever 1422 rotates. This ability for the point of rotation of the lever 1422 to translate within the aperture 1428 permits the rivet 1424 that connects the first arm of the lever 1422 to the inner tray to move in only an axial direction (e.g., along a left-to-right axis as seen in FIG. 14).

While apertures and rivets are disclosed herein for coupling the outer tray 1414, lever 1422, and inner tray, other mechanisms can be used to couple these elements together in a similar fashion as to that described herein.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

One or more elements or aspects or steps, or any portion (s) thereof, from one or more of any of the claims listed below can be combined with one or more elements or aspects or steps, or any portion(s) thereof, from one or more of any of the other claims or combinations thereof, to form one or more additional implementations and/or claims of the present disclosure.

What is claimed is:

1. A drive tray assembly comprising:
an outer tray rotatably couplable to a chassis, the outer tray being rotatable between an open position and a closed position;
an inner tray for receiving a drive, the inner tray being slidably coupled to the outer tray, the inner tray being slidable between a disengaged position and an engaged position relative to the outer tray;
a lever rotatably coupled to the outer tray, the lever having a first arm and a second arm, the first arm being mechanically coupled to the inner tray, movement of the lever causing the inner tray to move between the engaged position and the disengaged position; and
a handle slidably coupled to the outer tray and mechanically coupled to the second arm of the lever, the handle being axially movable between an extended position and a retracted position relative to the outer tray, movement of the handle between the extended position and the retracted position applying force to the second arm of the lever, the force causing the movement of the lever;
wherein the outer tray includes a guide channel for receiving at least a portion of the handle; the handle rotatable within the guide channel between a locking position and an unlocking position; the handle, when in the unlocking position, being slidably movable between the extended position and the retracted position, the handle, when in the locking position, locking from sliding at the extended position and at the retracted position.

2. The assembly of claim 1, further comprising:
a plurality of lower retention pegs positioned on an upper surface of the inner tray, each of the plurality of lower retention pegs being positioned to be received by a corresponding lower mounting hole of the drive when the drive is received by the inner tray, the plurality of lower retention pegs constraining the drive from horizontal movement with respect to the inner tray; and
a plurality of side retention pegs slidably coupled to the chassis, each of the plurality of side retention pegs being positioned to be received by a corresponding side mounting hole of the drive when the drive is received by the inner tray and the outer tray is rotated to the closed position.

3. The assembly of claim 1, further comprising a drive frame coupled to the chassis, the outer tray being rotatably coupled to the chassis via the drive frame, the outer tray being rotatably coupled to the drive frame at a first end of the outer tray.

4. The assembly of claim 3, further comprising:
a partition coupled to the drive frame and positioned below the outer tray; and
a second outer tray rotatably coupled to the chassis via the drive frame, the second outer tray being positioned below the partition.

5. The assembly of claim 1, wherein the handle includes a grip;
a rod having a first end coupled to the grip and a second end extending from the grip, the second end having a key, the key positioned to engage a first locking feature of the guide channel when the handle is in the locking position and the extended position, the key positioned to engage a second locking feature of a drive frame coupled to the chassis when the handle is in the locking position and the retracted position;
a connector coupled to the rod between the first end and the second end, the connector being rotatably free with respect to the rod, the connector engaging the second arm of the lever, the connector shaped to be rotatably fixed with respect to the guide channel when received by the guide channel; and
a biasing device for biasing the rod to the locking position.

6. The assembly of claim 5, wherein the inner tray includes a tab for locking the outer tray from rotation with respect to the chassis when the inner tray is in the engaged position.

7. The assembly of claim 6, further comprising a drive frame coupled to the chassis, the outer tray being rotatably coupled to the chassis via the drive frame, the outer tray being rotatably coupled to the drive frame at a pivot point, the drive frame including a locking structure adjacent to the pivot point, the tab of the inner tray being positioned adjacent to the locking structure to lock the outer tray from rotation with respect to the chassis when the inner tray is in the engaged position.

8. The assembly of claim 1, wherein the lever is rotatably coupled to the outer tray by a sliding pivot that slides between a first location when the inner tray is in the disengaged position and a second location when the inner tray is in the engaged position, the distance between the first location and the second location being selected to facilitate movement of the inner tray linearly in response to rotation of the lever about the sliding pivot.

9. The assembly of claim 1, wherein movement of the inner tray from the disengaged position to the engaged position causes a connector of the drive to mate with a corresponding connector of a computer system.

10. The assembly of claim 1, wherein the chassis includes a first end and a second end separated by sidewalls, wherein the outer tray is rotatably coupled to the chassis at the first end, and wherein the inner tray, when moving between the engaged position and the disengaged position while the outer tray is in the closed position, moves along an axis perpendicular to the sidewalls of the chassis.

11. A drive tray assembly comprising:
an outer tray rotatably couplable to a chassis, the outer tray being rotatable between an open position and a closed position;
an inner tray for receiving a drive, the inner tray being slidably coupled to the outer tray, the inner tray being slidable between a disengaged position and an engaged position relative to the outer tray, the inner tray including a tab for locking the outer tray from rotation with respect to the chassis when the inner tray is in the engaged position;
a lever rotatably coupled to the outer tray, the lever having a first arm and a second arm, the first arm being mechanically coupled to the inner tray, movement of the lever causing the inner tray to move between the engaged position and the disengaged position; and
a handle slidably coupled to the outer tray and mechanically coupled to the second arm of the lever, the handle being axially movable between an extended position and a retracted position relative to the outer tray, movement of the handle between the extended position and the retracted position applying force to the second arm of the lever, the force causing the movement of the lever, wherein the handle is movable between a locking position and an unlocking position when in the retracted position, wherein the outer tray is constrained from rotation with respect to the chassis when the handle is in the locking position in the retracted position;
a grip;
a rod having a first end coupled to the grip and a second end extending from the grip, the second end having a key, the key positioned to engage a first locking feature of the guide channel when the handle is in the locking position and the extended position, the key positioned to engage a second locking feature of a drive frame coupled to the chassis when the handle is in the locking position and the retracted position;
a connector coupled to the rod between the first end and the second end, the connector being rotatably free with respect to the rod, the connector engaging the second arm of the lever, the connector shaped to be rotatably fixed with respect to the guide channel when received by the guide channel; and
a biasing device for biasing the rod to the locking position.

12. The assembly of claim 11, further comprising:
a plurality of lower retention pegs positioned on an upper surface of the inner tray, each of the plurality of lower retention pegs being positioned to be received by a corresponding lower mounting hole of the drive when the drive is received by the inner tray, the plurality of lower retention pegs constraining the drive from horizontal movement with respect to the inner tray; and
a plurality of side retention pegs slidably coupled to the chassis, each of the plurality of side retention pegs being positioned to be received by a corresponding side mounting hole of the drive when the drive is received by the inner tray and the outer tray is rotated to the closed position.

13. The assembly of claim 11, further comprising a drive frame coupled to the chassis, the outer tray being rotatably coupled to the chassis via the drive frame, the outer tray being rotatably coupled to the drive frame at a first end of the outer tray.

14. The assembly of claim 13, further comprising:
a partition coupled to the drive frame and positioned below the outer tray; and
a second outer tray rotatably coupled to the chassis via the drive frame, the second outer tray being positioned below the partition.

15. The assembly of claim 11, further comprising a drive frame coupled to the chassis, the outer tray being rotatably coupled to the chassis via the drive frame, the outer tray being rotatably coupled to the drive frame at a pivot point, the drive frame including a locking structure adjacent to the pivot point, the tab of the inner tray being positioned adjacent to the locking structure to lock the outer tray from rotation with respect to the chassis when the inner tray is in the engaged position.

16. The assembly of claim 11, wherein the lever is rotatably coupled to the outer tray by a sliding pivot that slides between a first location when the inner tray is in the disengaged position and a second location when the inner tray is in the engaged position, the distance between the first location and the second location being selected to facilitate movement of the inner tray linearly in response to rotation of the lever about the sliding pivot.

17. The assembly of claim 11, wherein movement of the inner tray from the disengaged position to the engaged position causes a connector of the drive to mate with a corresponding connector of a computer system.

18. The assembly of claim 11, wherein the chassis includes a first end and a second end separated by sidewalls, wherein the outer tray is rotatably coupled to the chassis at the first end, and wherein the inner tray, when moving between the engaged position and the disengaged position while the outer tray is in the closed position, moves along an axis perpendicular to the sidewalls of the chassis.

* * * * *